Jan. 25, 1966   L. J. LORENZ   3,231,292
VEHICLE FENDER SUPPORT WITH TOOL BOX THEREIN
Filed March 10, 1964
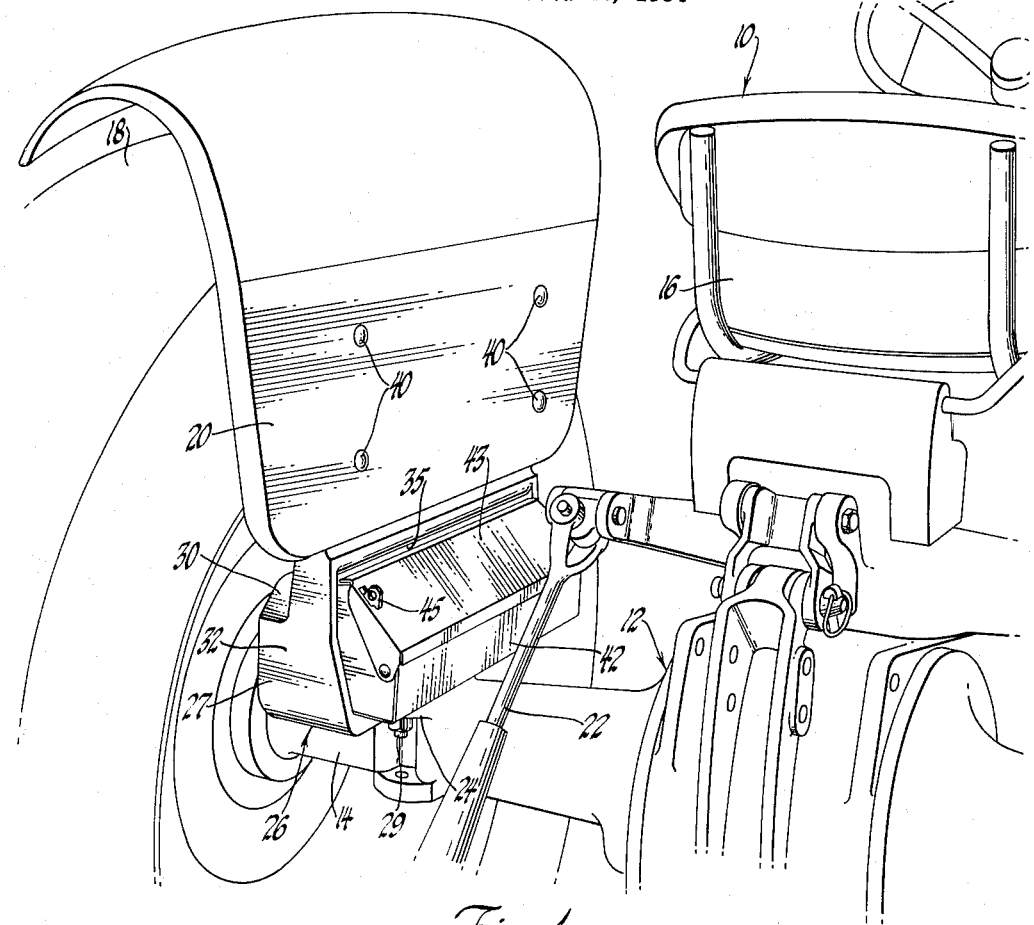
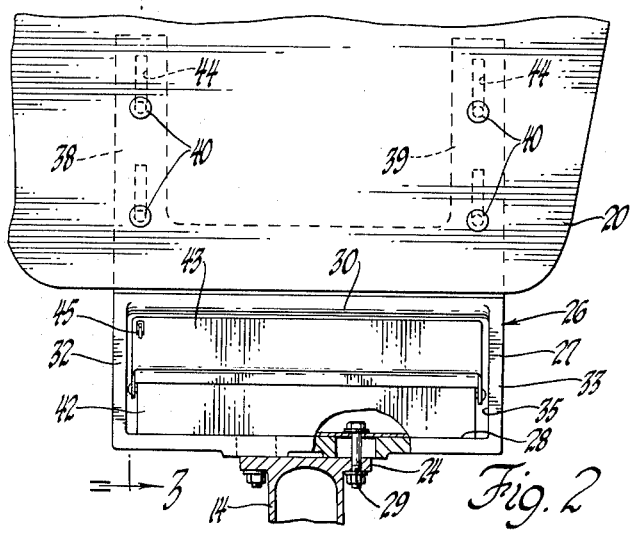
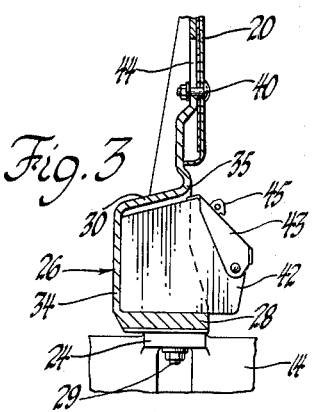
INVENTOR.
LEO J. LORENZ
BY
Tweedale & Gerhardt
ATTORNEYS.

3,231,292
VEHICLE FENDER SUPPORT WITH TOOL BOX THEREIN
Leo J. Lorenz, Farmington, Mich., assignor to Massey-Ferguson Inc., Detroit, Mich.
Filed Mar. 10, 1964, Ser. No. 350,741
3 Claims. (Cl. 280—157)

The present invention relates generally to vehicles and is particularly concerned with wheeled tractors of the type having a rear axle with fenders supported thereon.

In tractors and other similar vehicles, it is frequently necessary to make adjustments or minor repairs in the field, as well as to connect and disconnect various implements to the vehicle. However, there is ordinarily little, if any available space for storing tools in tractors and similar vehicles. Accessibility of the tools to the operator at the rear of the vehicle is particularly important.

The present invention lies in the provision of a wheel fender support for a tractor formed with a recess or housing in which a tool box may be detachably mounted so as to provide the operator with a readily accessible supply of necessary tools for making adjustments and repairs in the field.

The objects and advantages of the invention will become apparent from the following description of an illustrated example taken in connection with the accompanying drawings in which:

FIGURE 1 is a fragmentary perspective view of a left rear axle, fender and tool box assembly of a tractor embodying the invention;

FIGURE 2 is a fragmentary elevational view of the fender support shown in FIGURE 1; and FIGURE 3 is a sectional view taken on line 3—3 of FIGURE 2.

While the invention will be described in connection with a preferred embodiment, it should be understood that I do not intend to limit the invention to the exact construction shown. On the contrary, I intend to cover all alternatives, modifications and equivalents as may be included within the spirit and scope of the invention.

In the drawings, reference numeral 10 generally designates a tractor having a rear frame portion 12 including a tubular axle housing 14, a seat 16, wheel 18, a fender 20, and an implement hitch linkage including draft link supporting arms 22. Since the right side of the axle housing, right fender and wheel could be identical with the corresponding left side members, only the right side is shown.

Formed near the outer end of axle housing 14 are mounting lugs 24 to which is secured a fender support 26, which is preferably in the form of a metal casting. The casting forms a heavy massive member that not only acts as a fender support, but acts to increase the amount of weight over each drive wheel for increased traction. The fender support includes a housing portion 27 formed with an open recess 35 having a horizontal base or bottom wall 28, a top wall 30, end walls 32, 33, and a rear wall 34. Bolts 29 extend through bottom wall 28 and through lugs 24 to secure the fender support to axle housing 14.

Integrally formed along the upper, front edge of housing portion 27 is a fender support bracket having a pair of upstanding, arms 38 and 39 having vertical slots 44 formed therein. Fender 20 is secured to support bracket 36 by means of fasteners 40 which are received in the slots 44 of bracket arms 38 and 39. The slots allow vertical adjustment of the fenders 20 to accommodate various size wheels.

In the illustrated embodiment, a tool box 42 having a hinged or pivoted lid or cover 43 is received in recess 35 and is detachably secured to bottom wall 28 by the bolts 29 that secure the fender support to the axle housing. Consequently, a supply of tools may be available to the operator of the tractor at a location that will not interfere with the operation of the vehicle or any implements attached thereto. The tool box 42 could be secured in the fender support recess by means other than the bolts 29, for example by fastening means independent of the means used to attach the fender support to the housing. The tool box lid 43 is normally held closed by a pivoted latch member 45 carried by the tool box and extending through a slot in the lid 43. A hole in the latch is provided for insertion of a padlock to prevent unauthorized opening of the tool box.

I claim:

1. A fender support for tractors and similar vehicles comprising; a housing portion formed with a recess having a horizontal bottom wall, a top wall, a pair of end walls and a rear wall, a fender support bracket formed along the upper, front edge of the top wall having a pair of upstanding arms, a fender extending above said support, and means for adjustably securing said fender to said support in a plurality of vertical positions.

2. In a tractor having a rear axle housing extending transversely to the longitudinal axis of the vehicle, a fender support member mounted on the axle housing adjacent one end thereof, said fender support member having a housing portion formed with a tool box recess having a horizontal bottom wall, a top wall, a pair of end walls and a rear wall, said top, bottom and rear walls extending transversely of the axle housing and parallel to the vehicle longitudinal axis, and said rear wall extending between the outboard edges of the top, bottom and end walls such that the recess is open on its inboard side, and a fender attaching member projecting upwardly from the top wall and lying in a plane substantially parallel to the longitudinal axis of the vehicle.

3. The construction defined in claim 2 further including a tool box received in said recess, a plurality of bolts extending through the bottom walls of the recess and tool box into connection with the axle housing, a portion of said tool box projecting inboard from the open side of the recess and having an access cover pivotally mounted thereon.

References Cited by the Examiner
UNITED STATES PATENTS

| 1,467,555 | 9/1923 | Moore | 296—37 |
| 2,210,347 | 8/1940 | Story | 206—19.5 |
| 2,442,889 | 6/1948 | Deal | 296—3 |
| 2,593,692 | 4/1952 | Orelind | 280—157 X |
| 2,774,610 | 12/1956 | Ratcliffe | 280—152 |
| 2,797,957 | 7/1957 | North | 296—37 |
| 2,974,977 | 3/1961 | Herron | 280—152 |
| 3,058,771 | 10/1962 | Hill | 296—37 |

FOREIGN PATENTS

| 1,110,536 | 7/1961 | Germany. |

BENJAMIN HERSH, *Primary Examiner.*
LEO FRIAGLIA, *Examiner.*